(12) United States Patent
Blair et al.

(10) Patent No.: US 7,852,994 B1
(45) Date of Patent: Dec. 14, 2010

(54) SYSTEMS AND METHODS FOR RECORDING AUDIO

(75) Inventors: Christopher D. Blair, South Chailey (GB); Richard Laurence Heap, Chiswich London (GB); Robert John Barnes, Watford (GB)

(73) Assignee: Verint Americas Inc., Roswell, GA (US)

( * ) Notice: Subject to any disclaimer, the term of this patent is extended or adjusted under 35 U.S.C. 154(b) by 1292 days.

(21) Appl. No.: 11/395,498

(22) Filed: Mar. 31, 2006

(51) Int. Cl.
*H04M 1/64* (2006.01)

(52) U.S. Cl. ............... 379/88.17; 370/401; 379/215.01; 455/232.1; 455/411; 455/416; 455/456.1; 709/220

(58) Field of Classification Search ......... 370/352–356, 370/401; 379/67.1–87, 88.01–88.28, 93.01, 379/100.05, 101.01, 133–134, 215.01; 381/104; 386/95; 463/40; 700/94; 455/232.1, 411, 455/416, 456.1; 709/220
See application file for complete search history.

(56) References Cited

U.S. PATENT DOCUMENTS

| | | | |
|---|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |

(Continued)

FOREIGN PATENT DOCUMENTS

EP  0453128 A2  10/1991

(Continued)

OTHER PUBLICATIONS

"Customer Spotlight: Navistar International," Web pae, unverified print date of Apr. 1, 2002.

(Continued)

*Primary Examiner*—Gerald Gauthier
(74) *Attorney, Agent, or Firm*—Lawrence A. Aaronson, P.C.

(57) ABSTRACT

Systems and methods for recording audio are provided. In this regard, an representative method comprises: receiving audio information corresponding to an audio communication; receiving parameter information corresponding to a manner in which the audio communication is to be provided to a user in audible form; providing the audio information and the parameter information in the form of Internet Protocol (IP) packets; and recording the audio information and the parameter information provided by the IP packets.

23 Claims, 4 Drawing Sheets

U.S. PATENT DOCUMENTS

| | | | |
|---|---|---|---|
| 5,396,371 A | 3/1995 | Henits et al. | |
| 5,432,715 A | 7/1995 | Shigematsu et al. | |
| 5,465,286 A | 11/1995 | Clare et al. | |
| 5,475,625 A | 12/1995 | Glaschick | |
| 5,485,569 A | 1/1996 | Goldman et al. | |
| 5,491,780 A | 2/1996 | Fyles et al. | |
| 5,499,291 A | 3/1996 | Kepley | |
| 5,535,256 A | 7/1996 | Maloney et al. | |
| 5,572,652 A | 11/1996 | Robusto et al. | |
| 5,577,112 A | 11/1996 | Cambray et al. | |
| 5,590,171 A | 12/1996 | Howe et al. | |
| 5,597,312 A | 1/1997 | Bloom et al. | |
| 5,619,183 A | 4/1997 | Ziegra et al. | |
| 5,696,906 A | 12/1997 | Peters et al. | |
| 5,717,879 A | 2/1998 | Moran et al. | |
| 5,721,842 A | 2/1998 | Beasley et al. | |
| 5,742,670 A | 4/1998 | Bennett | |
| 5,748,499 A | 5/1998 | Trueblood | |
| 5,778,182 A | 7/1998 | Cathey et al. | |
| 5,784,452 A | 7/1998 | Carney | |
| 5,790,798 A | 8/1998 | Beckett, II et al. | |
| 5,796,952 A | 8/1998 | Davis et al. | |
| 5,809,247 A | 9/1998 | Richardson et al. | |
| 5,809,250 A | 9/1998 | Kisor | |
| 5,825,869 A | 10/1998 | Brooks et al. | |
| 5,835,572 A | 11/1998 | Richardson, Jr. et al. | |
| 5,862,330 A | 1/1999 | Anupam et al. | |
| 5,864,772 A | 1/1999 | Alvarado et al. | |
| 5,884,032 A | 3/1999 | Bateman et al. | |
| 5,907,680 A | 5/1999 | Nielsen | |
| 5,918,214 A | 6/1999 | Perkowski | |
| 5,923,746 A | 7/1999 | Baker et al. | |
| 5,933,811 A | 8/1999 | Angles et al. | |
| 5,944,791 A | 8/1999 | Scherpbier | |
| 5,948,061 A | 9/1999 | Merriman et al. | |
| 5,958,016 A | 9/1999 | Chang et al. | |
| 5,964,836 A | 10/1999 | Rowe et al. | |
| 5,978,648 A | 11/1999 | George et al. | |
| 5,982,857 A | 11/1999 | Brady | |
| 5,987,466 A | 11/1999 | Greer et al. | |
| 5,990,852 A | 11/1999 | Szamrej | |
| 5,991,373 A | 11/1999 | Pattison et al. | |
| 5,991,796 A | 11/1999 | Anupam et al. | |
| 6,005,932 A | 12/1999 | Bloom | |
| 6,009,429 A | 12/1999 | Greer et al. | |
| 6,014,134 A | 1/2000 | Bell et al. | |
| 6,014,647 A | 1/2000 | Nizzari et al. | |
| 6,018,619 A | 1/2000 | Allard et al. | |
| 6,035,332 A | 3/2000 | Ingrassia et al. | |
| 6,038,544 A | 3/2000 | Machin et al. | |
| 6,039,575 A | 3/2000 | L'Allier et al. | |
| 6,057,841 A | 5/2000 | Thurlow et al. | |
| 6,058,163 A | 5/2000 | Pattison et al. | |
| 6,061,798 A | 5/2000 | Coley et al. | |
| 6,072,860 A | 6/2000 | Kek et al. | |
| 6,076,099 A | 6/2000 | Chen et al. | |
| 6,078,894 A | 6/2000 | Clawson et al. | |
| 6,091,712 A | 7/2000 | Pope et al. | |
| 6,108,711 A | 8/2000 | Beck et al. | |
| 6,122,665 A | 9/2000 | Bar et al. | |
| 6,122,668 A | 9/2000 | Teng et al. | |
| 6,130,668 A | 10/2000 | Stein | |
| 6,138,139 A | 10/2000 | Beck et al. | |
| 6,144,991 A | 11/2000 | England | |
| 6,146,148 A | 11/2000 | Stuppy | |
| 6,151,622 A | 11/2000 | Fraenkel et al. | |
| 6,154,771 A | 11/2000 | Rangan et al. | |
| 6,157,808 A | 12/2000 | Hollingsworth | |
| 6,171,109 B1 | 1/2001 | Ohsuga | |
| 6,182,094 B1 | 1/2001 | Humpleman et al. | |
| 6,195,679 B1 | 2/2001 | Bauersfeld et al. | |
| 6,201,948 B1 | 3/2001 | Cook et al. | |
| 6,211,451 B1 | 4/2001 | Tohgi et al. | |
| 6,225,993 B1 | 5/2001 | Lindblad et al. | |
| 6,230,197 B1 | 5/2001 | Beck et al. | |
| 6,236,977 B1 | 5/2001 | Verba et al. | |
| 6,244,758 B1 | 6/2001 | Solymar et al. | |
| 6,282,548 B1 | 8/2001 | Burner et al. | |
| 6,286,030 B1 | 9/2001 | Wenig et al. | |
| 6,286,046 B1 | 9/2001 | Bryant | |
| 6,288,753 B1 | 9/2001 | DeNicola et al. | |
| 6,289,340 B1 | 9/2001 | Purnam et al. | |
| 6,301,462 B1 | 10/2001 | Freeman et al. | |
| 6,301,573 B1 | 10/2001 | McIlwaine et al. | |
| 6,324,282 B1 | 11/2001 | McIlwaine et al. | |
| 6,330,244 B1 * | 12/2001 | Swartz et al. | 370/401 |
| 6,347,374 B1 | 2/2002 | Drake et al. | |
| 6,351,467 B1 | 2/2002 | Dillon | |
| 6,353,851 B1 | 3/2002 | Anupam et al. | |
| 6,360,250 B1 | 3/2002 | Anupam et al. | |
| 6,370,574 B1 | 4/2002 | House et al. | |
| 6,404,857 B1 | 6/2002 | Blair et al. | |
| 6,411,989 B1 | 6/2002 | Anupam et al. | |
| 6,418,471 B1 | 7/2002 | Shelton et al. | |
| 6,459,787 B2 | 10/2002 | McIlwaine et al. | |
| 6,487,195 B1 | 11/2002 | Choung et al. | |
| 6,493,758 B1 | 12/2002 | McLain | |
| 6,502,131 B1 | 12/2002 | Vaid et al. | |
| 6,510,220 B1 | 1/2003 | Beckett, II et al. | |
| 6,535,909 B1 | 3/2003 | Rust | |
| 6,542,602 B1 | 4/2003 | Elazer | |
| 6,546,405 B2 | 4/2003 | Gupta et al. | |
| 6,560,328 B1 | 5/2003 | Bondarenko et al. | |
| 6,574,419 B1 * | 6/2003 | Nonomura et al. | 386/95 |
| 6,583,806 B2 | 6/2003 | Ludwig et al. | |
| 6,606,657 B1 | 8/2003 | Zilberstein et al. | |
| 6,661,886 B1 * | 12/2003 | Huart et al. | 379/215.01 |
| 6,665,644 B1 | 12/2003 | Kanevsky et al. | |
| 6,674,447 B1 | 1/2004 | Chiang et al. | |
| 6,683,633 B2 | 1/2004 | Holtzblatt et al. | |
| 6,697,858 B1 | 2/2004 | Ezerzer et al. | |
| 6,724,887 B1 | 4/2004 | Eilbacher et al. | |
| 6,738,456 B2 | 5/2004 | Wrona et al. | |
| 6,757,361 B2 | 6/2004 | Blair et al. | |
| 6,772,396 B1 | 8/2004 | Cronin et al. | |
| 6,775,377 B2 | 8/2004 | McIlwaine et al. | |
| 6,792,575 B1 | 9/2004 | Samaniego et al. | |
| 6,810,414 B1 | 10/2004 | Brittain | |
| 6,820,083 B1 | 11/2004 | Nagy et al. | |
| 6,823,384 B1 | 11/2004 | Wilson et al. | |
| 6,870,916 B2 | 3/2005 | Henrikson et al. | |
| 6,883,023 B1 * | 4/2005 | Wang et al. | 709/220 |
| 6,901,438 B1 | 5/2005 | Davis et al. | |
| 6,959,078 B1 | 10/2005 | Eilbacher et al. | |
| 6,965,886 B2 | 11/2005 | Govrin et al. | |
| 7,003,286 B2 * | 2/2006 | Brown et al. | 455/416 |
| 7,149,530 B1 * | 12/2006 | Arakawa et al. | 455/456.1 |
| 7,389,093 B2 * | 6/2008 | Kunito et al. | 455/232.1 |
| 7,418,304 B2 * | 8/2008 | Kim et al. | 700/94 |
| 2001/0000962 A1 | 5/2001 | Rajan | |
| 2001/0032335 A1 | 10/2001 | Jones | |
| 2001/0043697 A1 | 11/2001 | Cox et al. | |
| 2002/0038363 A1 | 3/2002 | MacLean | |
| 2002/0052948 A1 | 5/2002 | Baudu et al. | |
| 2002/0065911 A1 | 5/2002 | Von Klopp et al. | |
| 2002/0065912 A1 | 5/2002 | Catchpole et al. | |
| 2002/0128925 A1 | 9/2002 | Angeles | |
| 2002/0143925 A1 | 10/2002 | Pricer et al. | |
| 2002/0165954 A1 | 11/2002 | Eshghi et al. | |
| 2003/0055883 A1 | 3/2003 | Wiles et al. | |
| 2003/0078782 A1 * | 4/2003 | Blair | 704/270.1 |
| 2003/0079020 A1 | 4/2003 | Gourraud et al. | |
| 2003/0144900 A1 | 7/2003 | Whitmer | |
| 2003/0154240 A1 | 8/2003 | Nygren et al. | |

| | | | |
|---|---|---|---|
| 2004/0100507 | A1 | 5/2004 | Hayner et al. |
| 2004/0165717 | A1 | 8/2004 | McIlwaine et al. |
| 2005/0138560 | A1 | 6/2005 | Lee et al. |
| 2005/0276426 | A1* | 12/2005 | Ono et al. ............... 381/104 |
| 2006/0122835 | A1* | 6/2006 | Huart et al. ............. 704/258 |
| 2007/0021211 | A1* | 1/2007 | Walter ..................... 463/40 |
| 2008/0119165 | A1* | 5/2008 | Mittal et al. ............. 455/411 |
| 2008/0310628 | A1* | 12/2008 | Fujioka et al. .......... 380/201 |

FOREIGN PATENT DOCUMENTS

| | | | |
|---|---|---|---|
| EP | 0773687 | A2 | 5/1997 |
| EP | 0989720 | | 3/2000 |
| GB | 2369263 | | 5/2002 |
| WO | WO 98/43380 | | 11/1998 |
| WO | WO 00/16207 | | 3/2000 |

OTHER PUBLICATIONS

"DKSystems Integrates QM Perception with OnTrack for Training," Web page, unvereified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"Price WaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (© 2001).

Cybulski and Linden, "Teaching Systems Analysis and Design Using Multimedia and Patterns," unknown date, unknown source.

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.
Nelson et al. "The Assessment of *End-User Training Needs*," *Communications ACM* 38(7):27-39 (Jul. 1995).
O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-vol. users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business".
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You On (Yet)*, The AnchorDesk, Jul. 13, 1999.
Borland and Davis. *US West Plans Web Services on TV*, CNETNews. com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. Déjà vu—*Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, SCI-TECH, Dec. 4, 1997.
*Interactive TV Overview TimeLine*, Interactive TV News.
*Interactive TV Wars Heat Up*, Industry Standard.
Needle. *Will the Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, 093/28/96.
Kenny. *TV Meets Internet*, PC World Online, Mar. 28, 1996.
Linderholm. *Avatar Debuts Home Theater PC*, PC World Online, Dec. 1, 1999.
Mendoza. *Order Pizza WhileYyou Watch*, ABCNews.com.
Moody. *WebTV: What the Big Deal?*, ABCNews.com.
Murdorf, et al. *Interactive Television—Is There Life After the Internet?*, Interactive TV News.
Needle. *PC, TV or Both?*, PC World Online.
*Interview with Steve Perlman*, CEO of Web-TV Networks, PC World Online.
Press. *Two Cultures, The Internet and Interactive TV*, Universite de Montreal.
Reuters. *Will TV Take Over Your PC?*, PC World Online.
Rohde. *Gates Touts Interactive TV*, InfoWorld, Oct. 14, 1999.
Ross. *Broadcasters Use TV Signals to Send Data*, PC World Oct. 1996.
Schlisserman. *Is Web TV a Lethal Weapon?*, PC World Online.
Stewart. *Interactive Television at Home: Television Meets the Internet*, Aug. 1998.
Swedlow. *Computer TV Shows: Ready for Prime Time?*, PC World Online.
Wilson. *U.S. West Revisits Interactive TV*, Interactive Week, Nov. 28, 1999.

\* cited by examiner

SYSTEMS AND METHODS FOR RECORDING AUDIO

BACKGROUND

A telephony system, such as used in a trading room, supports a range of equipment. By way of example, at each trader's desk of a trading room, such equipment can include up to four telephony handsets, up to 32 loudspeaker channels, and up to two microphones. Unfortunately, disputes can arise in a trading room due to over-hearing and/or mis-hearing of communications provided by such equipment. The availability and quality of recordings of such communications, therefore, can be critical to resolving these disputes.

In a compliance-recording environment, it can be imperative that everything that could have been heard, and therefore acted upon, is recorded. This can include recording speech that was not originally intended for the handset/microphone from which the speech was heard. For instance, recording should be able to accommodate a situation in which a trader hears "buy" and acts on that communication even though the communication was being shouted into another handset.

Conventionally, the stringent recording requirements of a compliance-recording environment have produced recording systems that are deliberately over-sensitive. As a result, such systems tend to record low level audio such as background noise, in addition to the communications of interest. This, in turn, tends to require unnecessarily large amounts of data storage. Correspondingly, it can be difficult to locate a particular communication of interest among the numerous recorded communications.

Thus, a heretofore unaddressed need exists in the industry to address the aforementioned deficiencies and inadequacies.

SUMMARY

Systems and methods for recording audio are provided. In this regard, an exemplary embodiment of such a method comprises: receiving audio information corresponding to an audio communication; receiving parameter information corresponding to a manner in which the audio communication is to be provided to a user in audible form; providing the audio information and the parameter information in the form of Internet Protocol (IP) packets; and recording the audio information and the parameter information provided by the IP packets.

An exemplary embodiment of a system for recording audio comprises a communication tap. The communication tap is operative to receive audio information corresponding to an audio communication and to receive parameter information corresponding to a manner in which the audio communication is to be provided to a user in audible form. The communication tap is further operative to provide the audio information and the parameter information in the form of Internet Protocol (IP) packets.

Computer-readable media also are provided. In this regard, an exemplary embodiment of a computer-readable medium includes a computer program that comprises computer-executable instructions for performing the computer-implemented steps of: receiving audio information corresponding to an audio communication; receiving parameter information corresponding to a manner in which the audio communication is to be provided to a user in audible form, the parameter information comprising information corresponding to an identification of a communication device used to provide the audio communication to the user in audible form and an indication of volume control settings of the communication device at a time the audio communication was being provided to the user in audible form; and providing the audio information and the parameter information in the form of Internet Protocol (IP) packets.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

As will be described here with reference to several exemplary embodiments, systems and methods for recording audio are provided. In the exemplary embodiments that will be described, each is implemented in the context of a compliance-recording environment of a trading room, in which traders use a telephony system to facilitate trading. However, there is no intention to limit the invention to this particular type of environment, except as may be expressly set forth in the accompanying claims. Similarly, although much of this disclosure pertains to the recording of audio, the invention is not limited to the recording of audio, as video and other types of data also may be recorded in some embodiments.

In this regard, some embodiments can potentially provide one or more perceived advantages over conventional communication systems. By way of example, at least some embodiments permit the use of compression algorithms, such as G729 (and Annex B silence suppression), under the input conditions for which those compression algorithms were designed. Thus, significant disk storage capacity can be saved without risking audio quality. Additionally, higher quality recordings can be provided, e.g., no audio input should be able to mask out another input as can be the case with systems that exclusively utilize mixed audio channels.

At least some embodiments allow reconstruction of audio at levels that would have been heard at a trader's desk, i.e., in accordance with the volume control settings that the trader applied at the time of recording. In this manner, audio corresponding closely to the audio that was actually heard by the trader can be confirmed. Additionally, reconstruction of audio levels on each input to a mixed speaker can be provided regardless of the volume settings in effect at a trader's desk at the time. In these embodiments, someone replaying the recorded audio can hear everything that the trader could or should have heard had the volume controls at the desk been set differently. At least some embodiments make use of distributed call detail information, which allows for scalability, fault tolerance and sub-second time-stamping.

With respect to recording, at least some embodiments provide for parallel handling of the audio from the point where it leaves the trading room telephony system to the point where it is stored on multiple media. By way of example, a recording system can be used for recording the audio at two recorders, which may be collocated or separated, thereby potentially eliminating the need for a secondary archival process to copy the data to a secure location.

Another aspect utilized in at least some embodiments pertains to the handling of audio sources when multiple channels of the trading room telephony system are providing multiple copies of the same audio signal to different traders. In this regard, lower volumes of recordings can be provided due to the elimination of superfluous recording of the same audio source.

Figure 1:
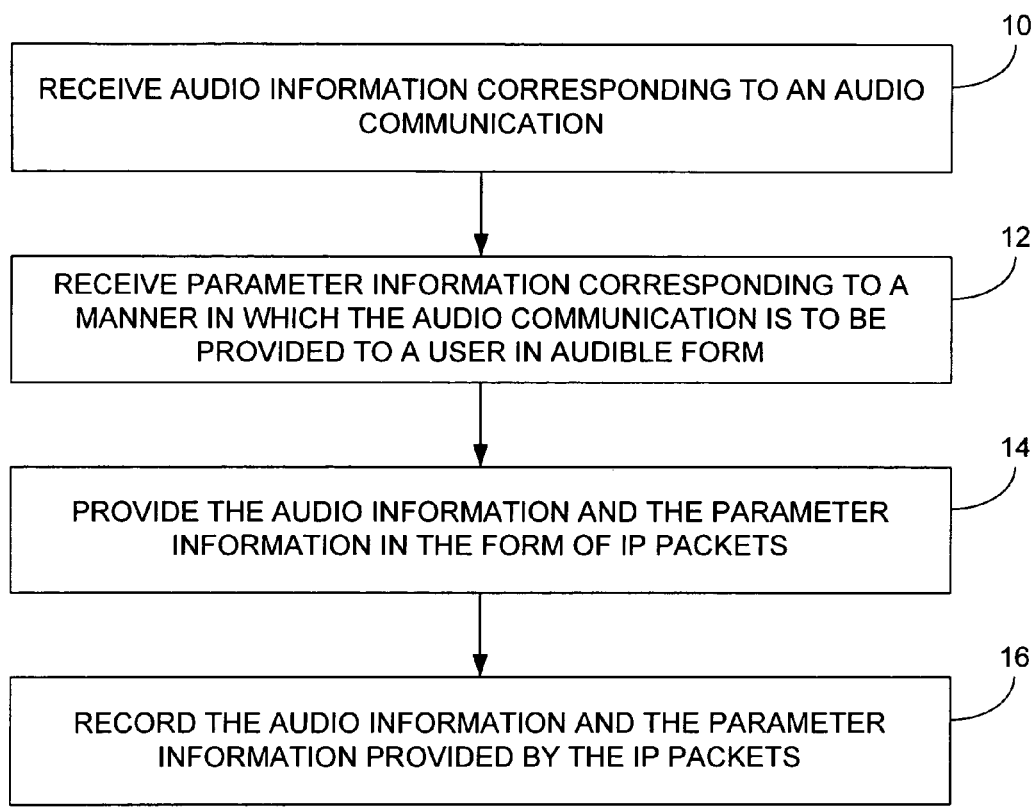
FIG. 1 is a flowchart illustrating functionality (or method steps) that can be performed by an exemplary embodiment of a system for recording audio.

Referring now to the drawings, FIG. 1 is a flowchart depicting functionality (or method steps) associated with an exemplary embodiment of a system for recording audio. In this regard, the functionality involves: receiving audio information corresponding to an audio communication (block 10); receiving parameter information corresponding to a manner in which the audio communication is to be provided to a user in audible form (block 12); providing the audio information and the parameter information in the form of Internet Protocol (IP) packets (block 14); and recording the audio information and the parameter information provided by the IP packets (block 16). Notably, the audio can be compressed and/or mixed prior to be directed for recording.

With respect to parameter information, such information can include indications of the date/time of a communication and/or recording thereof, the device used to provide communication to a user in audible form. Such parameter information can be used during replay of the recorded communications as will be described in greater detail later.

Figure 2:
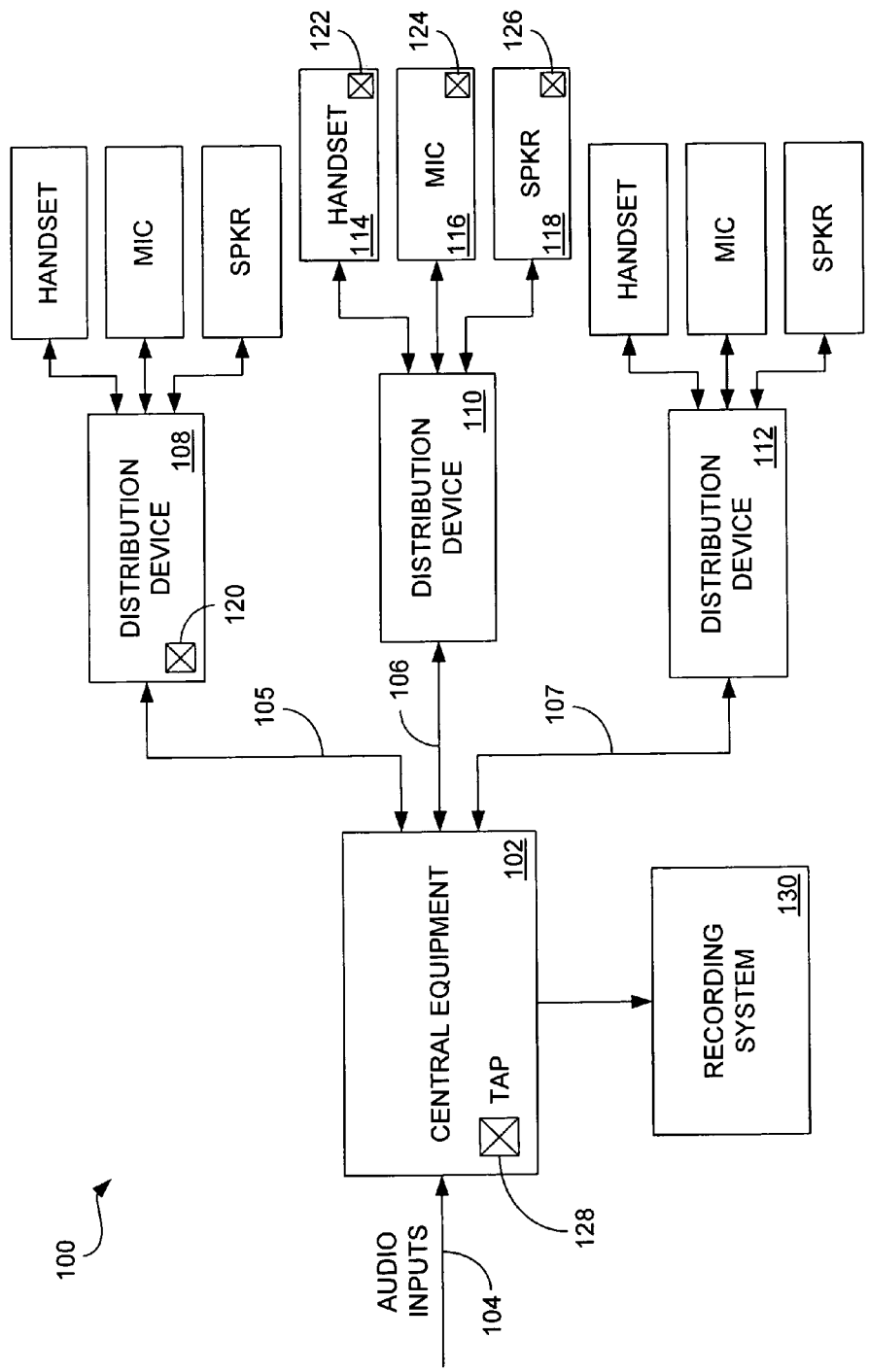
FIG. 2 is a schematic diagram illustrating an exemplary embodiment of a system for recording audio.

An exemplary embodiment of a system for recording audio that can be used to implement the functionality depicted in FIG. 1 is illustrated schematically in FIG. 2. In particular, system 100 is implemented in a trading room environment, which is an exemplary environment in which compliance recording of audio typically is conducted. System 100 incorporates central equipment 102 that is operative to route audio to and from users. By way of example, the audio inputs can include telephone audio, e.g., audio provided by POTS, Voice over IP (VoIP) communications, and television audio, among others. As such, the system 100 can include various components that are not shown in FIG. 2, such as servers, for example, with such various other components being omitted for ease of description. Regardless of the particular implementation details, the central equipment 102 is operative to receive audio inputs, e.g., input 104, and to provide audio outputs, e.g., outputs 105, 106 and 107, for use by one or more users.

In the embodiment of FIG. 2, system 100 is configured in several manners for receiving and recording audio. There is, however, no intention to limit the inventive aspects to the particular configurations shown in FIG. 2.

In this regard, central equipment 102 is operative to route audio to various locations. Specifically, central equipment 102 routes audio to distribution devices (or turrets) 108, 110 and 112, each of which typically is located at a different trader's desk. The distribution devices, in turn, are operative to permit selection and routing of audio to various communication devices, such as handsets, microphones, hands-free units and speakers, based on user inputs received at the distribution devices. For instance, distribution device 110 selectively routes audio to and/or from handset 114, microphone 116 and speaker 118. The distribution devices also permit adjusting of volume levels of the audio and facilitate mixing of the audio by directing multiple channels of audio to designated communication devices.

Particularly relevant to the recording of audio is the use of one or more communication taps. In particular, five such taps are depicted in FIG. 2. Specifically, communication tap 120 is located at the distribution device 108, communication tap 122 is located at handset 114, communication tap 124 is located at microphone 116, communication tap 126 is located at speaker 118, and communication tap 128 is located with the central equipment 102 of the telephony system. For instance, communication tap 128 is associated with a processor (not shown) of the central equipment.

In operation, each communication tap is operative to receive audio and provide audio information for recording. Depending upon the particular location of the communication tap, this can be accomplished in different manners. By way of example, if a communication tap is configured to receive voice data from a user talking through a communications device, such a communication tap can be configured to convert the voice data into data recognizable by a data network, such as the Internet. This conversion may include converting the voice data into packets of data for transmission via a data network.

This particular functionality is implemented by the communication tap 120, which is located at the distribution device 108. In particular, responsive to receiving audio from an associated handset or microphone, the communication tap 120 converts the audio into packets. Notably, the distribution device 108 also receives audio that is to be directed to the various communication devices for output in audible form, such as audio that is to be provided to the speaker. The communication tap 120 also converts this audio into packets. The audio information contained in the packets is then directed to the recording system 130 for recording.

Additionally, with respect to the audio that is to be directed to the various communication devices for output in audible form, the packets can contain information corresponding to various parameters associated with the audio. By way of example, the parameters can include a time associated with the audio, such as the time the audio was received. Additionally or alternatively, the parameters can include a designation of the communication device to and/or from which the audio is delivered and/or the volume control settings of the communication device. After the audio information contained in the packets has been recorded, the audio can be reconstructed by referencing the stored parameter information and audio information.

Of particular interest is the ability to replay the recorded communications in a manner closely corresponding to the manner in which the original communication was perceived by the user. Clearly, the manner in which the original communication was perceived is related, at least in part, to the device used to provide the communication to the user and the volume control settings of such a device. Thus, when the original communication was provided in audible form to a user via a desktop speaker, the parameter information associated with that speaker can be used to reconstruct the audio characteristics that the user experienced when listening to the communication.

In some embodiments, this can be accomplished by correlating the stored parameter information associated with the speaker (at the time of the communication) with the stored audio information. Such reconstruction can even take place if the device used to replay the communication, e.g., a desktop speaker, was not the same type of device used when the original communication was being provided in audible form to the user. For instance, if the original communication was provided via a handset speaker, stored parameter information associated with the communication could be evaluated. Responsive thereto, the replay of the communication could be modified to closely correspond to the audio that was provided to the user via the handset speaker. In particular, the audio that is to be replayed via a desktop speaker could be modified to be more indicative of audio that is provided via a handset speaker.

Clearly, various other scenarios can be accommodated in various embodiments. By way of example, although parameter information typically is recorded for later use, such information could be disregarded such that the parameter information does not necessarily affect replay. Additionally or alternatively, parameter information may be subject to modification to enable alteration of a replay so that the communication can be better understood.

In contrast to a communication tap located at a distribution device, the communication tap 122 is located at a communication device. Communication tap 122 is operative to receive audio from a user and to convert that audio into packets. In this case, the audio information contained in the packets is directed through the associated distribution device and ultimately to the recording system for recording. Notably, communication tap 122 may not have access to all of the parameter information, such as the corresponding volume control settings that are adjusted at the distribution device. Thus, information corresponding to the volume control settings, for example, can be acquired by another device. For instance, such other device could provide information that can later be correlated with the information provided by communication tap 122.

As another example, several communication taps can be used to acquire different types of audio information. By way of example, a communication tap located at a communication device can be used to acquire audio corresponding to voice data input to that device by a user, while the communication tap located at the associated distribution device can be used to acquire audio information corresponding to audio that is being directed to the user to be heard in audible form. Thus, one or more communication taps can be designated for acquiring inputs from the user and one or more communication taps can be designated for acquiring outputs for the user.

As still another example, a single communication tap could be used to acquire all audio information of the telephony system. By way of example, communication tap 128 located at the central equipment can be configured to acquire all audio inputs and outputs from the communication devices. Notably, communication tap 128 also may not have access to all the parameter information associated with the communication, such as the corresponding volume control settings that are adjusted at the various distribution devices. Thus, any such parameter information can be acquired by other devices and correlated with the information provided by communication tap 128.

Regardless of the particular functionality used to acquire the audio information and the parameter information, that information is converted into packets, which are directed to the recording system 130 for recording. In particular, the recording system is operative to receive the packets provided by one or more communication taps and to store the information contained therein so that, if need be, the audio can be reconstructed by referencing the stored audio information and parameter information.

Figure 3:
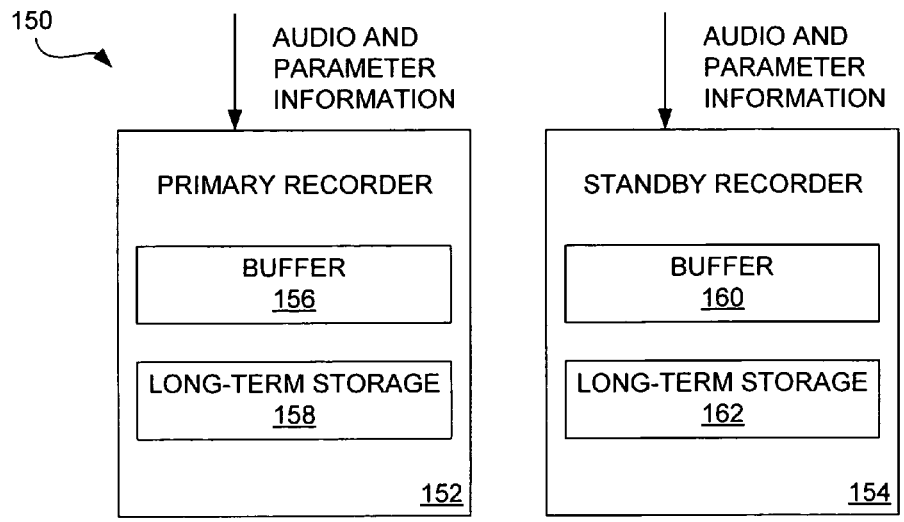
FIG. 3 is a schematic diagram of an exemplary embodiment of a recording system.

An exemplary embodiment of a recording system is depicted schematically in FIG. 3, in which two recorders are used. In this embodiment, each of the recorders stores a copy of the information. Notably, the two recorders may be widely separated and hence the two copies provide safety from disruption or total destruction of either site.

In at least some embodiments, duplication of the stored information and the consequent protection afforded can be achieved by having a single recorder connected to a Storage Area Network, for example. This configuration provides fault tolerant paths resulting in mirrored copies of the information being stored in two locations. In some embodiments, the recorders are typically within a few kilometers of each other, with the link between the disk arrays being a dedicated optical fiber connection, for example.

By sending audio to two recorders, ideally via distinct and hence fault tolerant network paths, receipt of the information by at least one recorder typically occurs even if a network component or a recorder fails. Notably, one or more of the recorders can determine in real-time, for example, what information is to be recorded. In some of these embodiments, if at least one of the recorders appears to be recording information that is to be stored, one or more of any other recorders may discontinue recording. Additionally or alternatively, the decision regarding what to record can involve selective recording of the communications available for recording. That is, even if a recorder received information corresponding to a communication for recording, a portion of the information may not be recorded by that recorder, with such a determination being based, at least in part, on recording rules, for example.

In order to avoid using twice the required storage space, it is desirable, in some cases not to store the information on both recorders. This is especially true when the ultimate storage location uses a fault tolerant system such as a SAN described above. As long as one of the recorders that receives the information manages to write the information to long-term storage, e.g., a hard drive, then it may be desirable for the recorder not to use its long-term storage for storing a copy. However, due to multiple layers of buffering, it may be difficult for the recording system to determine whether information has been committed to long-term storage. It may also be difficult to respond quickly to recorder failures since the network between recorders may take many seconds to re-route traffic around a failed routing node. In both cases, there is a danger that many seconds of audio can be lost. This inadequacy can be potentially alleviated by having both recorders receive information that is buffered, such as in a buffer memory. An example recording system that implements this functionality is depicted schematically in FIG. 3.

As shown in FIG. 3, recording system 150 incorporates a first or primary recorder 152 and a second or standby recorder 154. Each of the first and second recorders incorporates a buffer and a long-term storage. In particular, recorder 152 includes buffer 156 and long-term 158, and recorder 154 includes buffer 160 and long-term storage 162.

The first and second recorders are operative to receive the packets and ensure that the information contained in the packets is recorded. Specifically, the recorder 152 writes the information from buffer 156 to long-term storage 158, e.g., a hard drive, and then discards the information from the buffer. The second recorder maintains the information in buffer 160 until the information is assumed to have been transferred to long-term storage 158 of the first recorder. For example, the information can be held in the buffer 160 for at least a set time threshold. This threshold can be set to be greater than the sum of the worst case time that information takes to be saved to the long-term memory using the standard buffered communication streams, and the worst case network transmission time between the primary and standby recorders. Thus, at the point where a decision is made that the primary recorder (or network path to that recorder) has failed, all information back to at least that which the primary recorder can safely be assumed to have written to disk is still held in the buffer of the standby recorder. The standby recorder writes to disk all information held that would normally have been recorded by the presumed failed recorder. Responsive to determining that the primary recorder is not properly recording the information, the standby recorder can indicates an alarm condition to ensure that the problem is addressed as rapidly as possible before another component fails in the now potentially non-fault tolerant fallback system.

In some embodiments, the standby recorder may act as such to more than one primary recorder (although only one primary recorder is depicted in FIG. 3 for ease of description). Since the load imposed on the standby recorder is less than that on the primary recorders, i.e., the standby recorder is only buffering information as long as the primary recorders appear to be operating properly, the standby recorder can process incoming information from more than one primary recorder. This provides a more economical fallback methodology. However, when the standby recorder does take over from a presumed failed primary recorder, it may then be unable to continue receiving and processing the incoming information that is also being directed to the other, still healthy, primary recorders. In this case, the standby recorder can communicate with the telephony system components that are sending the information to the standby recorder. For instance, the standby recorder could instruct the telephony system to stop sending the information associated with the operative primary recorders, thereby leaving the standby recorder with the information that is being sent to the presumed failed recorder. The load on the standby recorder is then comparable to that on the primary recorder for which it is acting as a backup.

In some alternative embodiments, the standby recorder can be configured to write all information received to long-term storage. However, the standby recorder can be further configured to delete information after it is confirmed that the information also has been committed to long-term storage of one or more primary recorders. By way of example, if the information is older than a specified threshold (e.g. 1 hour or 1 day), the information can be deleted from long-term storage of the standby recorder so long as the standby recorder receives status information indicating that the primary recorder(s) are operating properly. If, however, it is determined that a primary is no longer operating properly, the standby recorder can stop deleting information from long-term storage, thus ensuring an overlap period with the primary recorder that is suspected to have failed.

Note that none of the above results in information transmission to any of the primary recorders being affected. Thus, the decision to begin "covering" for a primary that may have failed does not impact that primary recorder nor does it impact the telephony system. There is thus potentially no adverse affect on the telephony system or the primary recorder, which may still be perfectly healthy, but unable to communicate status information to the standby recorder.

Figure 4:
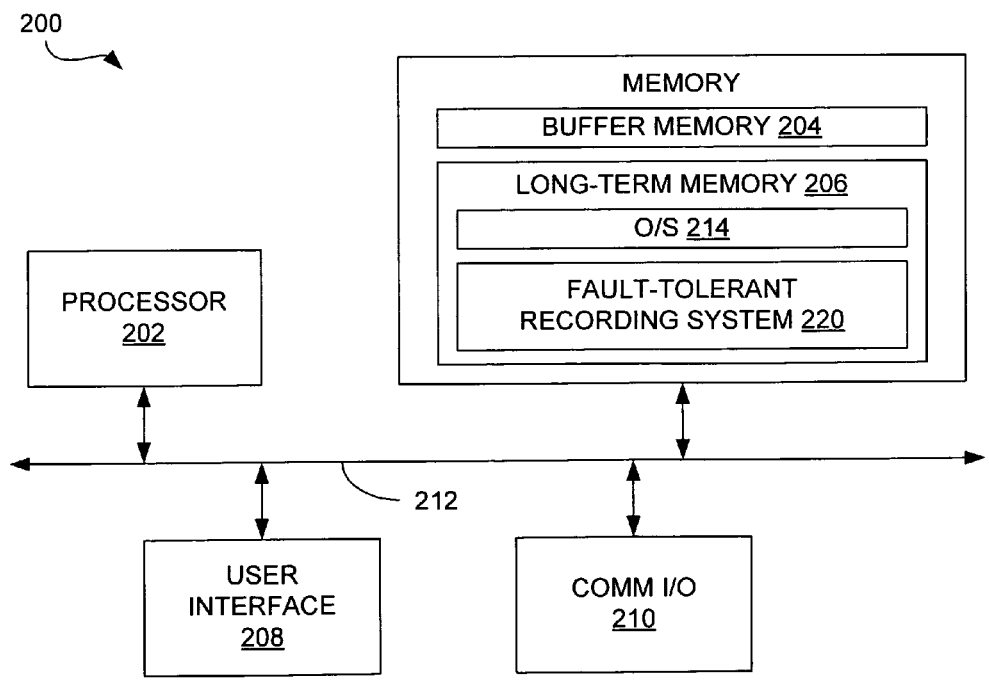
FIG. 4 is a schematic diagram illustrating an exemplary embodiment of a recording system.

FIG. 4 is a schematic diagram illustrating an embodiment of a recorder, such as could be used as a second or standby recorder. Generally, in terms of hardware architecture, recorder 200 includes a processor 202, a buffer memory 204, a long-term memory 206, a user interface 208, and one or more input and/or communication (I/O) device interface(s) 210 that are communicatively coupled via a local interface 212. The local interface 212 can include, for example but not limited to, one or more buses or other wired or wireless connections. The local interface 212 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 202 may be a hardware device for executing software, particularly software stored in long-term memory 206.

The processor 202 can be any custom made or commercially available processor, a central processing unit (CPU), an auxiliary processor among several processors associated with the recorder, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80×86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The memory 204, 206 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 204, 206 may incorporate electronic, magnetic, optical, and/or other types of storage media. Note that the memory 204, 206 can have a distributed architecture, where various components are situated remote from one another, but can be accessed by the processor 202. Additionally, long-term memory 206 can also include an operating system 214, as well as instructions associated with a fault-tolerant recording system 220.

The software in memory may include one or more separate programs, each of which includes an ordered listing of executable instructions for implementing logical functions. In this regard, a nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc., and Windows CE® available from Microsoft® Corporation). The operating system 486 can be configured to control the execution of other computer programs and provides scheduling, input-communication control, file and data management, memory management, and communication control and/or related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory, so as to operate properly in connection with the operating system 214.

When the recorder 200 is in operation, the processor 202 is configured to execute software stored within the memory, to communicate data to and from the memory, and to generally control operations of the recorder pursuant to the software. Software in memory, in whole or in part, is read by the processor 202, perhaps buffered, and then executed.

Figure 5:
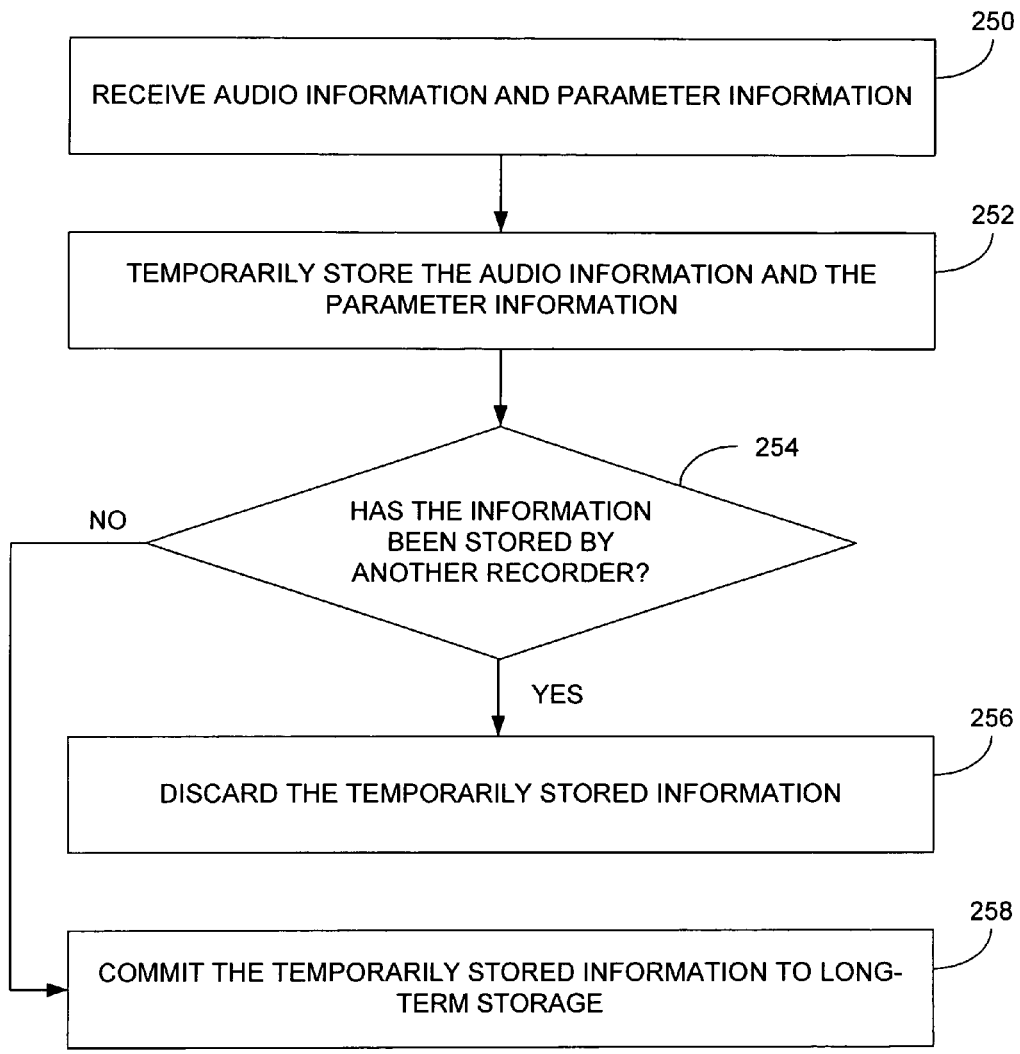
FIG. 5 is a flowchart illustrating exemplary steps that can be performed by a recording system, such as the recording system of FIG. 4.

FIG. 5 is a flowchart illustrating functionality associated with the embodiment of the recorder of FIG. 4. In this regard, the functionality may be construed as beginning at 250, where audio information and parameter information are received. In block 252, the information is temporarily stored, such as by being stored in buffer memory of the recorder. In block 254, a determination is made regarding whether the information, a copy of which is being provided to another recorder, has been stored in long-term memory of that other recorder. If it is determined that the audio information has been stored by the other recorder, the information that is being temporarily stored is discarded (block 256). However, if it is not determined that the information has been stored by the other recorder, the audio information is committed to long-term storage (block 258), such as by being stored in a long-term memory.

It should be noted that control of the aforementioned functionality can be facilitated by a device other than a recorder. By way of example, a designated recording controller could be used to monitor the recording of information and provide the requisite control signals to the recorders for causing information to be stored and/or discarded as appropriate.

In at least some embodiments, recording channels can be optimized such that for each distinct audio stream that is received, fewer copies of such a signal are recorded than are actually present. By way of example, an optimized implementation may only record one copy of each distinct audio signal. In some embodiments, a recorder can perform this functionality locally, and can optionally advise a communication tap that a particular audio stream is redundant. Although potentially recording only one copy of each distinct audio input, parameters that affect the processing of these inputs, such as current connections with the inputs and volume settings applied should be recorded to enable proper reconstruction.

If an audio input is designated as redundant and, thus, not to be recorded again, the corresponding communication tap could continue to send information regarding the connections of that redundant audio input. Therefore, should the connections change, audio could once again be provided for recording if necessary. In this way, each new audio input can be recorded without risk of losing the first few packets of information. In some embodiments, the recorders can communicate information between themselves about which audio inputs are being recorded and can thus determine which inputs are redundant. The recorders could then advise the communication taps of this fact to reduce the load on the tap and the intervening network as an audio input is suspended from being recorded.

In at least some embodiments, should N copies of a recorded audio input be required, N+n inputs could be kept active at any one time. Only N of these could be recorded to long-term memory with the other n being recorded in buffer memory. Should one of the N inputs being recorded terminate, this gives the recording system time to start storing one of the 'n' spare copies. Only if all connections terminated at the same time, or before further copies of the input could be restarted, would information corresponding to the audio inputs be lost. Note that the former case does happen where the audio input actually ends, but in this case there is no further data to be stored.

By passing this information to the recorder in the same stream and hence via the same network path(s) as the audio packets, the system obtains information in a distributed fashion with that reaching each recorder being in proportion to and relevant to the audio streams that recorder is storing. If audio information is being received, there is a very high degree of probability that the call detail information associated with it is also being received. The time correlation of the two streams can be quite good. Having traveled the same path and being sequence numbered together, the audio and call detail information are processed by the recorder in the same order as they occurred in the telephony system. Together, these attributes allow the recorder to rely on the presence of the call details and to act on them in real-time, tagging the audio accurately with the information known to be relevant to it, regardless of the transmission and buffering delays between the telephony system and the recorder.

In other embodiments, redundancy of recording can be provided by operating recording systems in parallel. In such embodiment, all communications could be recorded by each recording system, e.g., twice in the case of two such systems. Additionally, there need not be a real-time linkage between the recording systems or requirements for any sophisticated recording error management.

In some of these embodiments, the recording systems could post recording of the communications in a database in which redundant recordings can be identified. Thus, if a communication is recorded more than once, the communication can be marked, e.g., tagged, as such. Thereafter, an archive system could pulls the communications not marked as duplicates to its own storage to be retained or archived for replay as is appropriate. Therefore, in operation, communications can be pulled from whichever of the parallel recorders records the communications.

Once pulled to an archive system, the corresponding recordings of the parallel recorders can be deleted. In such an embodiment, if a recorder fails, the communication can be pulled from the other recorder. This potentially reduces the need for the local recorders to implement a RAID format, and hence could be cheaper. Additionally, failure modes are covered including those that occur post recording of the communication, i.e., if the archive system is unable to pull a recording from one recorder because the recorder fails during the pull, it can pull the corresponding recording (or missing portion thereof) from another recorder.

It should be noted that the flowcharts included herein show the architecture, functionality and/or operation of implementations that may be configured using software. In this regard, each block can be interpreted to represent a module, segment, or portion of code, which comprises one or more executable instructions for implementing the specified logical function (s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

It should be noted that any of the executable instructions, such as those depicted functionally in the accompanying flowcharts, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for recording audio, comprising:
   receiving audio information corresponding to an audio communication at a communication tap;
   receiving parameter information corresponding to a manner in which the audio communication is to be provided to a user in audible form, the parameter information being information about the audio communication as it was received by the communication tap;
   providing, by the communication tap, the audio information and the parameter information in the form of Internet Protocol (IP) packets; and
   recording the audio information and the parameter information provided by the IP packets at a recorder.

2. The method of claim 1, wherein, prior to providing the audio information and the parameter information in the form of IP packets, the audio information is compressed.

3. The method of claim 1, wherein:
   the audio information corresponds to a single channel of audio; and
   prior to providing the audio information and the parameter information in the form of IP packets, the audio information is mixed with other audio information of another channel.

4. The method of claim 1, wherein recording comprises:
   recording the audio information a fewer number of times than that of a number of users receiving the audio information in audible form.

5. The method of claim 4, wherein, in recording the audio information, if the audio information is being received by more than two users, the audio information is recorded no more than two times.

6. The method of claim 4, wherein, in recording the audio information, the parameter information comprises information identifying which of the users were receiving the audio information.

7. The method of claim 1, wherein recording comprises:
   providing the audio information and the parameter information to each of a first recorder and a second recorder.

8. The method of claim 7, wherein recording further comprises:
   initiating storing of the audio information and the parameter information in long-term storage of the first recorder;
   buffering the audio information and the parameter information in the second recorder; and
   removing the audio information and the parameter information from the buffer of the second recorder responsive to the audio information and the parameter information being stored in the long-term storage of the first recorder.

9. The method of claim 1, wherein receiving audio information comprises:
   obtaining the audio information from a communication device used to provide the audio information to a user in audible form.

10. The method of claim 1, wherein receiving parameter information comprises:
    obtaining the parameter information from a communication device used to provide the audio information to a user in audible form.

11. The method of claim 1, further comprising:
    using the parameter information to determine volume settings of a communication device used to provide the audio information to the user in audible form; and
    replaying the recorded audio information in a manner corresponding to the volume settings.

12. The method of claim 1, wherein the parameter information comprises connection information corresponding to communication devices to which the audio information is being provided to users in audible form.

13. The method of claim 12, wherein the communication devices comprise at least one of handsets, loud speakers and hands-free units.

14. The method of claim 1, wherein, in recording the audio information and the parameter information, a determination regarding which of the audio information and the parameter information is to be recorded is determined in real-time.

15. A system for recording audio comprising:
    a communication tap operative to receive audio information corresponding to an audio communication and to receive parameter information corresponding to a manner in which the audio communication is to be provided to a user in audible form, the communication tap being further operative to provide the audio information and the parameter information in the form of Internet Protocol (IP) packets,
    wherein the parameter information being information about the audio communication as it was received by the communication tap.

16. The system of claim 15, further comprising:
    means for recording the audio information and the parameter information provided by the IP packets.

17. The system of claim 15, further comprising:
    a recording system operative to record the audio information and the parameter information provided by the IP packets, the recording system comprising a first long-term storage device operative to store the audio information and the parameter information.

18. The system of claim 17, wherein the recording system is further operative to determine, in real-time, which of the audio information and the parameter information is to be recorded.

19. The system of claim 17, wherein:
- the recording system comprises a first recorder and a second recorder, the first recorder having the first long-term storage device, the second recorder having a buffer and a second long-term storage device;
- the first recorder is operative to initiate storing of the audio information and the parameter information in the first long-term storage device;
- the second recorder is operative to buffer the audio information and the parameter information in the buffer at least until being notified that the audio information and the parameter information have been stored in the first long-term storage device of the first recorder.

20. The system of claim 19, wherein the second recorder is operative to store the audio information and the parameter information in the second long-term storage device.

21. The system of claim 16, further comprising:
- a communication device operative to provide the parameter information associated therewith for storage with the audio information.

22. A non-transitory computer-readable medium having a computer program stored thereon, the computer program comprising computer-executable instructions for performing the computer-implemented steps of:
- receiving audio information corresponding to an audio communication;
- receiving parameter information corresponding to a manner in which the audio communication is to be provided to a user in audible form, the parameter information comprising information corresponding to an identification of a communication device used to provide the audio communication to the user in audible form and an indication of volume control settings of the communication device at a time the audio communication was being provided to the user in audible form, the parameter information being information about the audio communication as it was received by the communication tap; and
- providing the audio information and the parameter information in the form of Internet Protocol (IP) packets.

23. The non-transitory computer-readable medium of claim 22, wherein the method further comprises determining, in real-time, which of the audio information and the parameter information is to be recorded.

* * * * *